United States Patent [19]

Castain

[11] Patent Number: 4,969,782
[45] Date of Patent: Nov. 13, 1990

[54] KEY BLANK ADAPTOR

[76] Inventor: David T. Castain, Apt. I-1, 850 Russell Ave., Santa Rosa, Calif. 95401

[21] Appl. No.: 453,846

[22] Filed: Dec. 20, 1989

[51] Int. Cl.[5] .............................................. B23C 3/35
[52] U.S. Cl. ........................................ 409/81; 76/110
[58] Field of Search ................ 409/81, 82, 83; 76/110

[56] References Cited

U.S. PATENT DOCUMENTS

| | | | |
|---|---|---|---|
| 3,457,831 | 7/1969 | Adler et al. | 409/81 |
| 4,051,748 | 10/1977 | Sherman | 409/81 |
| 4,657,448 | 4/1987 | Alexander | 409/81 |
| 4,780,032 | 10/1988 | Uyeda et al. | 409/82 |

*Primary Examiner*—Daniel W. Howell
*Attorney, Agent, or Firm*—Richard C. Litman

[57] ABSTRACT

An adaptor for converting a conventional straight cut key duplicator into one capable of executing both straight and angular cuts. The angular cuts are necessary in duplicating MEDECO and EMHART type keys. The adaptor mounts to the vise grips of a conventional machine. It comprises a back plate and a front plate that is pivotally mounted to the back plate. A key vise is mounted to the front plate and is adjustable by means of an adjustment screw and a fine adjustment collar. The pivoting motion of the front plate allows for the angular cuts to be made on a key held in the adaptor. A set screw that mates with a plurality of apertures on the back plate holds the front plate in position at the desired angle.

8 Claims, 2 Drawing Sheets

KEY BLANK ADAPTOR

BACKGROUND OF THE INVENTION

1. FIELD OF THE INVENTION

The present invention relates to cutters used to duplicate keys of various types. More particularly the present invention relates to cutters that are used to duplicate the special type of keys known as the MEDECO or EMHART keys. These keys have angled cuts and are able to be cut by utilizing the present invention in combination with a standard straight cut type of duplicator.

2. DESCRIPTION OF THE PRIOR ART

Most keys in the past and in the present are of the conventional straight cut variety, having cuts that are made normal to the shank or barrel of the key. Not all keys fit into this category though, MEDECO and EMHART keys being two known varieties that differ from the conventional straight cut type. These keys have angled cuts, meaning that the cuts that form the pattern along the shaft are not made normal to the shank of the key. Usually these angles fall within the range of between 0 and 25 degrees from the normal. A straight cutting duplicator could not possibly make duplicates of these angled keys due to the angled nature.

Special duplicating cutting machines have been made and are available on the market that have the ability to cut both types of keys, straight and angled. Various models include the HPC 1200, HPC 3333M2, the RYTAN RY256 and the FRAMON #2. All of these commercially available models have swiveling cutter heads for cutting MEDECO type keys.

What has not been done till the present has been to allow old straight cut duplicators to be adapted for cutting MEDECO and EMHART style keys. This adapter would also maintain the ability of the machines to duplicate straight cut keys in addition to the angle cut keys. Until now, locksmiths had to purchase a new machine for the angled cut keys to be duplicated. The present invention allows for key makers to keep their old machines without having to replace them with a brand new cutting machine.

Additional patents are cited below as being relevant to the present invention, but in no way disclose, whether taken singly or in combination, the applicant's present invention.

U.S. Pat. No. 4,780,032 issued to Uyeda et al. discloses a key duplicating machine using a template key or a code and having a pivotally mounted housing that may be raised or lowered to contact the movable parts of the machine.

U.S. Pat. No. 4,051,748 issued to Sherman discloses a key cutting machine that has an angle-sensing stylus to identify the angle at which the key blank must be brought into contact with the cutting surface.

SUMMARY OF THE INVENTION

The present invention comprises an adapter for a standard key duplication cutting machine that allows for the manufacture of keys having angled cuts as opposed to the standard straight cut. This adapter is constructed of two identical sections, one which holds the key to be duplicated and the other to hold the blank that is to be cut with the pattern of the desired key. Each section mounts onto a conventional straight cut key duplicator by utilizing the vise present on the machine to hold the adapter. Each adapter section includes: a vise in which to hold a key; a face plate having an adjustment screw disposed through it onto which the vise is mounted for horizontal movement; a back plate that is pivotally mounted to the face plate, allowing for angular displacement of the face plate and vise in relation to the cutter. The face plate can be rotated in 5 degree increments in relation to the back plate and then set in place. This angular displacement of the adapter allows for both straight and angular cut keys to be made without having to buy an entirely new machine.

Accordingly, it is one object of the present invention to provide an adapter for straight cut key duplicating machines allowing for angular cuts to then be made on key blanks.

It is another object of the present invention to provide an adapter for a straight cut key duplicator that allows for angular cuts to be made that is mounted to the already present key vise of the straight cut duplicating machine.

It is a further object of the present invention to provide an adapter for a straight cut key duplicator that allows for angular cuts to be made that has a pivoting section that holds the key to be cut allowing for the angular cuts to be made.

It is yet a further object of the present invention to provide an adapter for a straight cut key duplicator that allows for angular cuts to be made that has an adjustment screw on the adapter to adjust the key blank position in a horizontal manner for the cutter.

It is a still further object of the present invention to provide an adapter for a straight cut key duplicator that allows for angular cuts to be made that has identical opposite sections that allows for measurements to be taken on the key to be duplicated.

These and other objects of the present invention will become readily apparent upon further review of the following specification and drawings.

BRIEF DESCRIPTION OF THE DRAWINGS

Similar reference characters denote corresponding features consistently throughout the attached drawings.

A DETAILED DESCRIPTION OF THE PREFERRED EMBODIMENT

Figure 1:
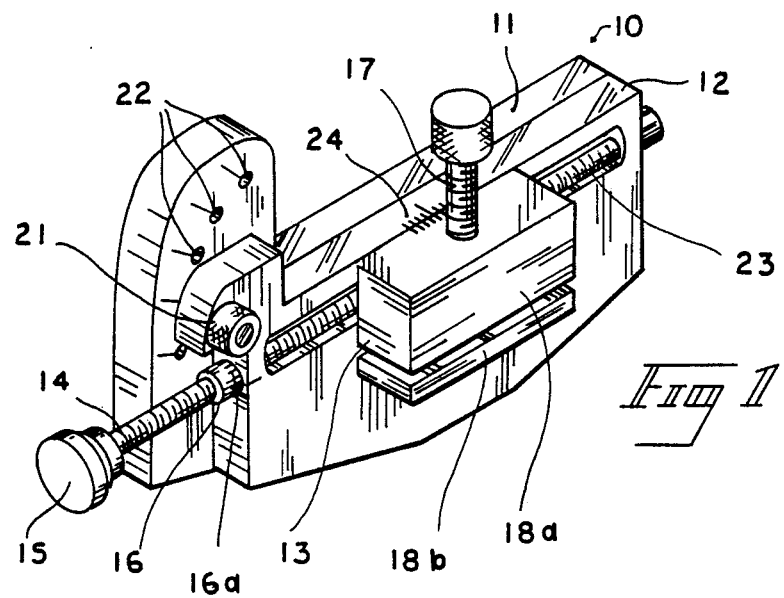
FIG. 1 shows a perspective view of the adapter.

The present invention of an adapter 10 for a conventional straight cut key duplicator is shown from the front in FIG. 1. It comprises a back plate 11, a face plate 12 pivotally mounted to the back plate by means of joint 30 bored through back plate 11 and a key vise 13 mounted to the face plate 12. Set through the side of the face plate 12 is an adjustment screw 14 with an end knob 15 that allows for the translational movement of the key vise 13 along the length of the face plate 12. The key vise 13 rides on the adjustment screw 14 in slot 23. The adjustment screw 14 has a fine thread grade that allows for minute movement of the key vise 13. Around the adjustment screw 14 is disposed a fine adjustment collar 16 having a series of evenly spaced hash marks 16a disposed around its periphery. This collar 16 is for the fine adjustment necessary for the correct positioning of a key in the key vise 13 in relation to a cutter 3 or guide 4. The scale commonly used is that one complete turn of the adjustment screw 14 moves the vise 13 and the key that it holds 0.040 of an inch. The fine adjustment collar 16 moves the vise 13 and key 0.005 inches for every hash mark 16a. The face plate 12 has a corresponding reference mark 16b next to the fine adjustment collar 16.

Figure 4:
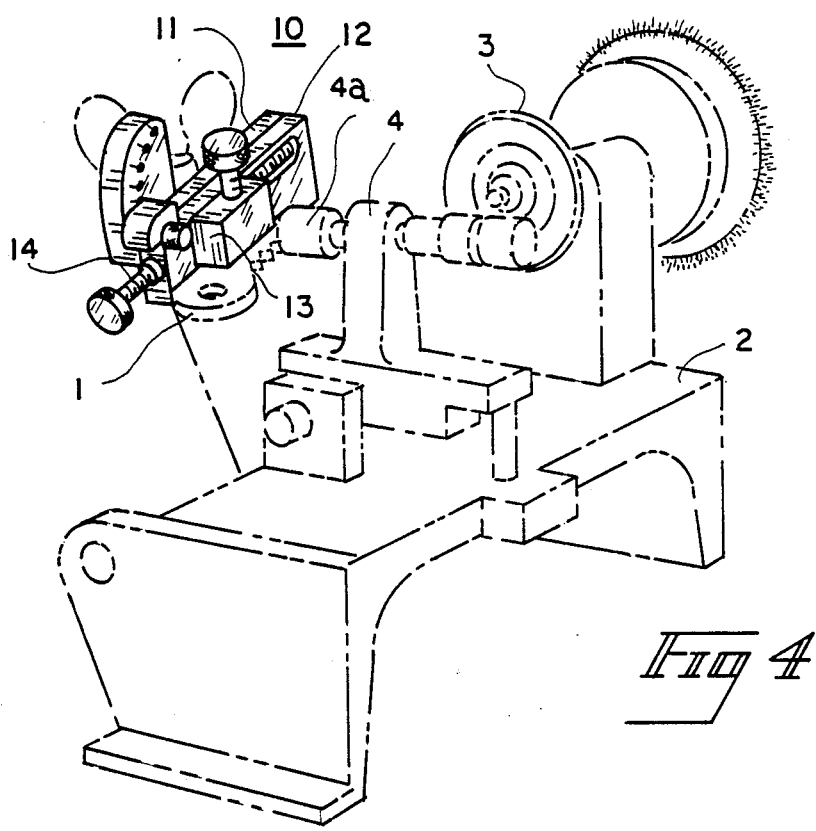
FIG. 4 shows a perspective view of the adapter mounted to the conventional key duplicator with a key in the vise and the front plate rotated to make an angular cut.

The key vise 13 has a tightening screw 17 that loosens or tightens the grip on a key 1 placed within the jaws 18a,18b of the key vise 13. Keys 1 as shown in FIG. 4 are placed horizontally within the jaws 18a,18b of the key vise 13 as would be conventional in an ordinary key duplicator. The adjustment screw 14 and collar 16 are then used to translate the key 1 and vise 13 relative to the cutter or guide of a conventional duplicating machine 2. Both the key vise 13 and front plate 12 have measurement scales 24 placed on them. The edge of the vise 13 lines up with the centerline 25 of the front plate. Vise movement is then measured from this centerline.

Figure 2:
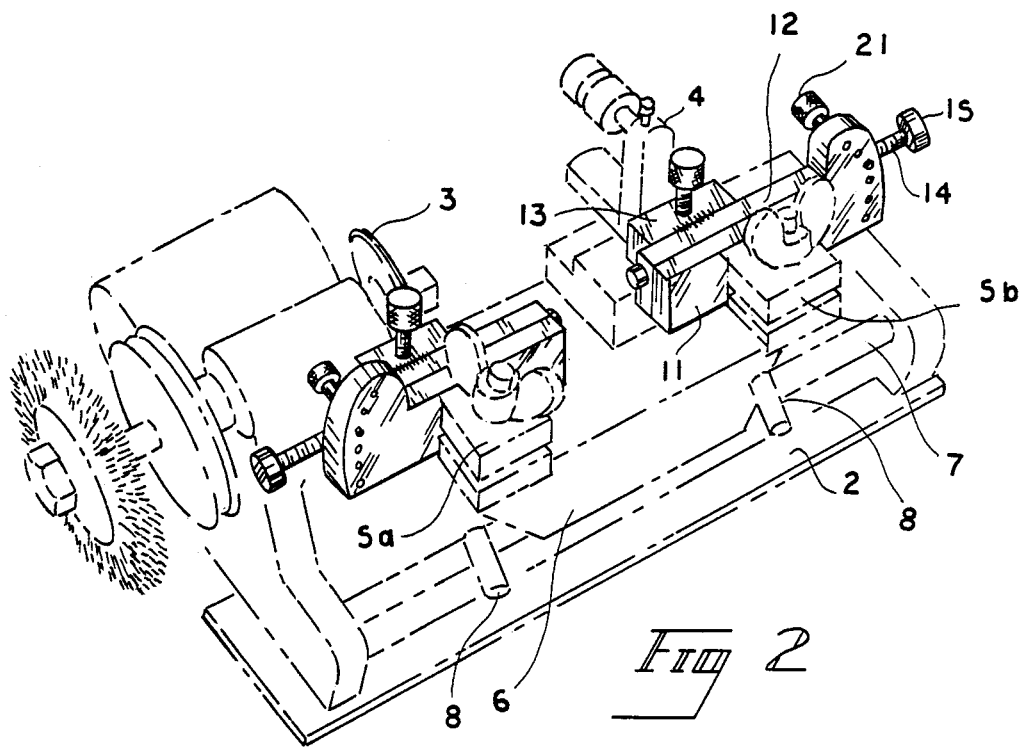
FIG. 2 shows a perspective view of a conventional straight cut key duplicator with the adapters mounted to it.

Such a conventional straight cut key duplicating machine 2 is shown in FIG. 2. The machine 2 has a cutter 3 and a guide 4. There are two conventional key vises 5a,5b, one for the cutter 3 and one for the guide 4. The conventional key vises 5a,5b are mounted to a carriage 6 that horizontally slides along bar 7. The first step in preparing the conventional key duplicator for receiving the adapters 10 is to immobilize the carriage 6 by placing stops 8 on either side of the carriage 6. The adapters 10 can now be placed onto the conventional key duplicator 1.

Figure 3:
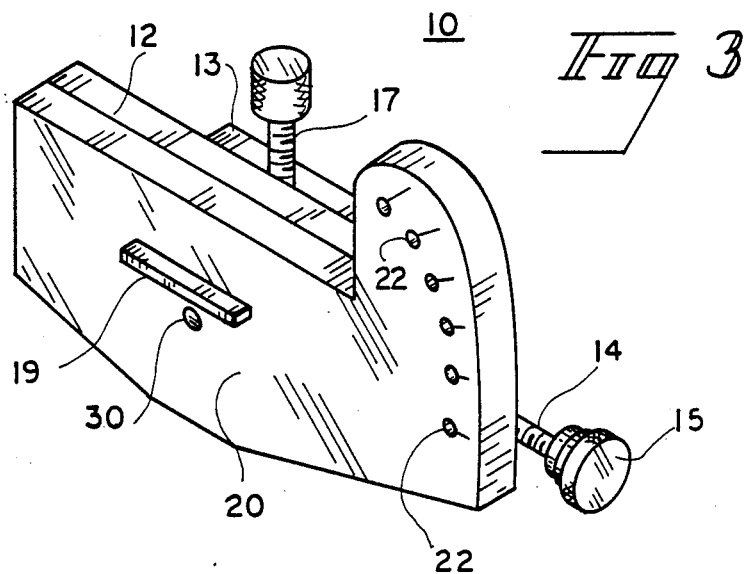
FIG. 3 shows an alternate perspective view of the adapter.

The adapters 10 are placed, one each, onto the conventional key vises 5a,5b by means of shims 19, shown in FIG. 3, placed on the rear 20 of the back plates 11. The shims 19 are placed in the jaws of the conventional key vises 5a,5b which are then tightened to hold the adapters 10 in place. The keys 1 can now be placed in the adapter vise 13 as shown in FIG. 4. Measurements are made with the guide 4 which has a micrometer measuring device 4a to measure the depth of each cut to be made from the pattern key. The movements are then duplicated on the cutter side for the key that is to be cut, as is conventional for making straight cuts on keys.

The most important feature of the adapters 10 comes into play when it is necessary to make angled cuts. Back plate 11 and front plate 12 are pivotally mounted to each other. A set screw 21 mounted onto the front plate 12 keeps the two plates 11,12 from moving relative to one another. This set screw 21 fits into a series of apertures 22 disposed along the periphery of the back plate 11. By releasing the set screw 21 from the corresponding aperture 22, the back and front plates 11,12 can rotate relative to one another, the front plate 12 being movable while the back plate 11 is held stationary on the carriage 6 and vise 5. The apertures 22 are set so as to be 5° apart when the front plate 12 is rotated. Most MEDECO and EMHART keys have cuts that are 20° from normal in relation to the key shank 1a. The additional apertures can be used to duplicate any other type of angled keys that have different angles from those commonly used.

Thus, a means of providing key makers and locksmiths with the ability to convert their conventional straight cut key duplicating machines into ones capable of cutting angled keys has been disclosed. The present invention will allow these individuals to save considerable money in not having to purchase a new machine for this purpose. It should therefore be considered novel in view of the prior art.

It is to be understood that the present invention is not limited to the sole embodiment described above, but encompasses any and all embodiments within the scope of the following claims.

I claim:
1. An adapter for a conventional key duplicator, including:
   a back base portion;
   a front portion pivotally mounted to said back base portion;
   a key vise translatably mounted to said front portion, said vise having clamp means to hold a key;
   an adjustment means for controlled translational movement of said key vise, said adjustment means comprises a rotating screw disposed through said front portion, said key mounted on said vise, said vise mounted on said rotating screw; wherein
   said adapter is mounted to a conventional straight cut key duplicator and gives the capability to cut both straight and angled cut keys.
2. The adapter according to claim 1, wherein:
   said back base portion having disposed therethrough at a peripheral section, a plurality of apertures arranged in an arcuate manner;
   said front portion has disposed therethrough a set screw for placement through one of said apertures when it is desired to lock said front portion in place relative said back base portion.
3. The adapter according to claim 2, wherein:
   said apertures are arranged in 5° intervals.
4. The adapter according to claim 1, including:
   shims disposed on a side of said back base portion opposite said front portion, said shims for placement in a vise grip of a conventional key duplicator.
5. The adapter according to claim 1, wherein:
   said back base portion and said front portion are both plates having substantially flat planar surfaces.
6. The adapter according to claim 1, including:
   a fine adjustment collar disposed around said adjustment screw, said collar abutting said front portion.
7. An adapter for a conventional key duplicator, including:
   a back base portion;
   a front portion pivotally mounted to said back base portion;
   a key vise translatably mounted to said front portion, said vise having clamp means to hold a key;
   attachment means on said back base portion opposite said front portion, said attachment means for mounting said adapter to a vise grip of a conventional key duplicator; wherein
   said adapter is mounted to a conventional straight cut key duplicator and gives the capability to cut both straight and angled cut keys.
8. An adapter for a conventional key duplicator, including:
   a back base portion;
   a front portion pivotally mounted to said back base portion;
   a key vise translatably mounted to said front portion, said vise having clamp means to hold a key;
   said back base portion having disposed therethrough at a peripheral section, a plurality of apertures arranged in an arcuate manner;

said front portion has disposed therethrough an elongated member for placement through one of said apertures when it is desired to lock said front portion in place relative said back base portion; wherein said adapter is mounted to a conventional straight cut key duplicator and gives the capability to cut both straight and angled cut keys.

* * * * *